Sept. 3, 1963   G. P. ICKES ETAL   3,102,965
COMMUTATOR AND METHOD OF MAKING THE SAME
Filed Sept. 6, 1960   2 Sheets-Sheet 1

INVENTORS
GILBERT P. ICKES
ROBERT W. MARSH
ROBERT J. PLAS
By Justin W. Macklin
ATTY Sept. 3, 1963   G. P. ICKES ETAL   3,102,965
COMMUTATOR AND METHOD OF MAKING THE SAME
Filed Sept. 6, 1960   2 Sheets-Sheet 2
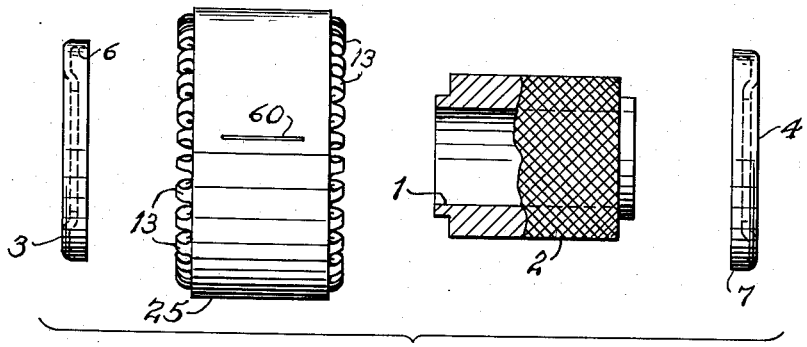
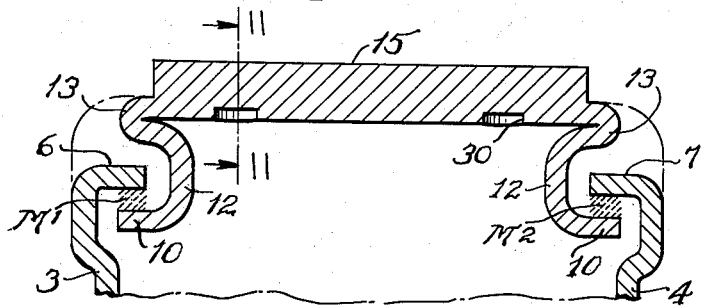
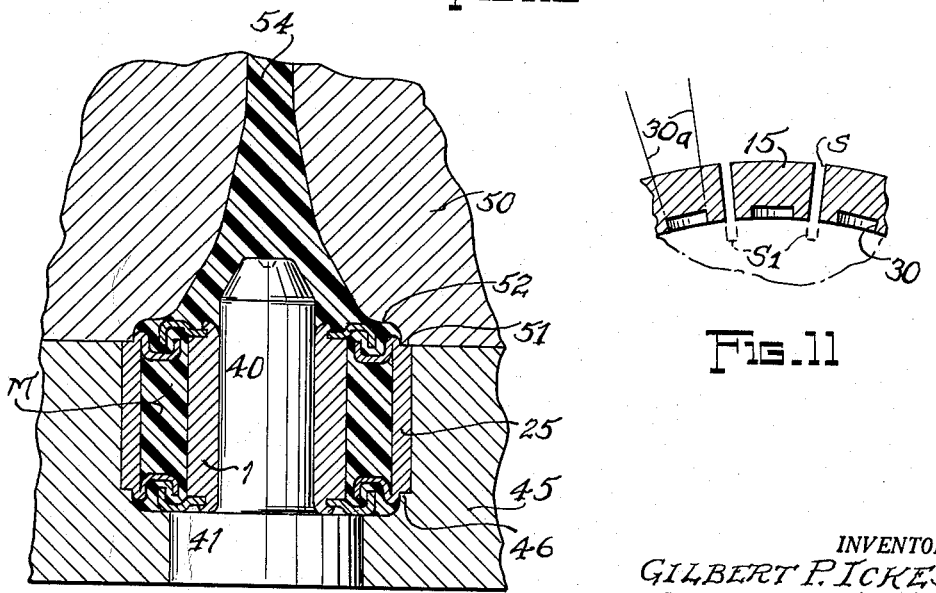
INVENTORS
GILBERT P. ICKES
ROBERT W. MARSH
ROBERT J. PLAS
BY Justin W. Macklin
ATTY United States Patent Office 3,102,965
Patented Sept. 3, 1963

3,102,965
COMMUTATOR AND METHOD OF MAKING
THE SAME
Gilbert P. Ickes, Robert W. Marsh, and Robert J. Plas, Elyria, Ohio, assignors to Amherst Metal Products, Inc., Amherst, Ohio, a corporation of Ohio
Filed Sept. 6, 1960, Ser. No. 54,168
2 Claims. (Cl. 310—235)

This invention relates to commutators and improved steps comprising a method of making the same.

The commutator with which this invention is particularly concerned comprises a metallic hub adapted to be mounted on a shaft and a plurality of bars parallel to the axis and a supporting means in the nature of molded insulating material which serves essential functions, namely, maintaining the respective positions of the components and anchoring of the commutator bars, and also acting as effective electrical insulating material between the segments forming the commutator bars.

An object of the invention is to provide a novel and effective mechanical anchoring of the individual commutator bars which shall be consistent with the forming of a cylindrical member which is later cut between the anchoring members to form the circumferentially separated commutator bars.

General objects of the invention include providing the finished commutator which will withstand much higher rotational speeds in proportion to its diameter than prior commutators of this general nature in which the anchoring of the individual commutator bars depends only upon the strength of the molded insulating material. Our novel construction provides rigid mechanical metal elements in radially overlapping spaced relation, whereby a portion of the molded insulating material between the hub and bars is in direct compression, while material under compression is prevented from any tendency to flow laterally.

More specific objects include the formation of the metal parts such that opposed shoulder surfaces may be positioned to overlap longitudinally, that is, transversely of radial lines for such effective anchoring, while permitting convenient assembly and enabling the carrying out of simple molding operation.

Another specific object is to provide additional anchoring connections within the area of each commutator bar which may coact with the molded insulating material and aid in preventing any loosening resulting in minute vibration.

A general objective is that the finished commutator assembly with its separated commutator bars may maintain a high degree of circumferential accuracy. Commutators according to our invention may be made in various sizes and meet exacting requirements. Commutators of an inch and a quarter in diameter, for example, made according to the present invention, have been subjected to rotational speeds of thirty to forty thousand r.p.m. or more, and when the temperature of the parts rose to 400° F. or 200° C. Correspondingly severe tests have to be met in maintaining accuracy and uniformity of spacing to resist, when in use, 225 volts direct current from bar to bar, and from the bars to the hub will resist as high as 2100 volts, 60 cycle A.C.

Other objects of the invention include the shaping of a blank to be formed into the cylinder from which the commutator bars are to be cut and which blank may be shaped to provide the anchoring elements, spaced according to the number of commutator bars required, and which may also have means for circumferentially locating the first and remaining indexed saw cuts separating the cylinder in predetermined segments forming the commutator bars.

A further object is to so construct the hub and end portions rigid therewith as to readily coact with comparatively simple die members to permit molding of the insulating and supporting material under very high pressure with complete uniformity and without distortion of any of the parts.

Other general objects are to so form the hub retaining elements and coacting anchors as to permit rapid high production with uniform accuracy and economical manufacture and assembly.

Other specific advantages and novel characteristics will become apparent in the following description which relates to the accompanying drawings.

In the drawings:

FIG. 9 is a composite of a group of the elements and anchoring retaining members and the side elevation of the completed cylinder;

FIG. 10 is an enlarged diagrammatic sectional view illustrating the position of the anchoring elements and the portion of a molded retaining and insulating material subjected to direct compression under centrifugal force;

FIG. 11 is a detail view on the same scale, showing the incidental anchoring depressions formed in each commutator bar, and FIG. 12 shows a mold particularly adapted for holding the parts in their proper relation while the insulating molded material is forced therein.

Figure 1:
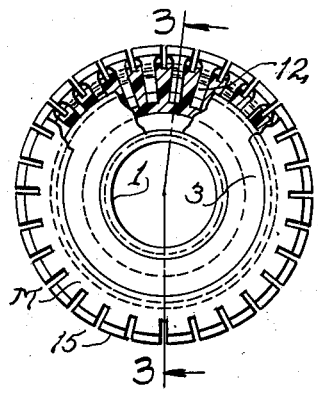
FIG. 1 is an end elevation of the finished commutator.
Figure 2:
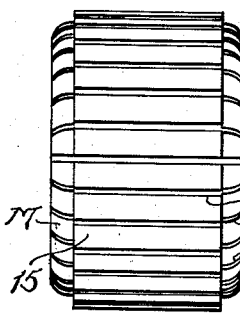
FIG. 2 is a side elevation of the same.
Figure 3:
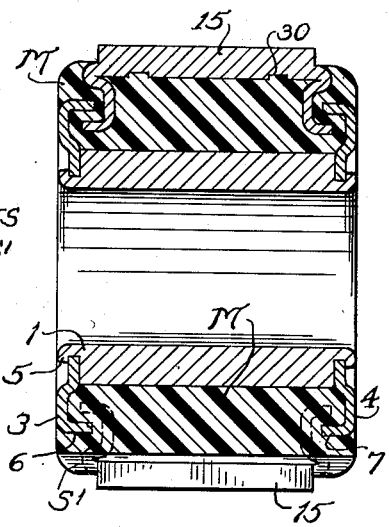
FIG. 3 is an axial cross section on a somewhat enlarged scale.
Figure 4:
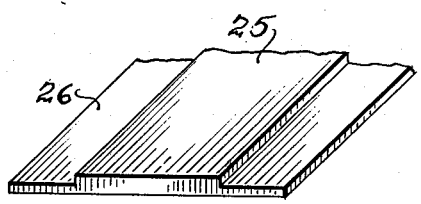
FIG. 4 is a perspective view of a portion of the blank from which the commutator bars and their anchoring elements are formed.
Figure 5:
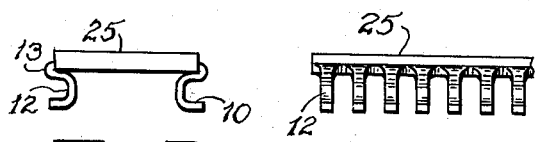
FIG. 5 is a fragmentary portion of this blank with the thin side portions cut to form the extensions for the anchoring elements.

Except for FIGS. 3, 10, and 11, the views show the parts on the same scale, which, however, is larger than the so called small commutators, although commutators of comparable size or larger may be made by the method of the present invention.

Referring to the drawings by the use of reference numerals and characters, a metallic hub 1 is shown as having a cylindrical bore and may have a knurled exterior 2 (FIG. 9). Supporting and retaining flanges 3 and 4 are suitably secured in substantially radial positions and held by out-turned portions 5 of the hub formed by spinning or swedging. These flanges may be secured by brazing or welding. Each of the members 3 and 4 has an outwardly offset radial portion and an inturned short cylindrical flange portion as at 6 and 7, respectively.

Figures 6, 7:
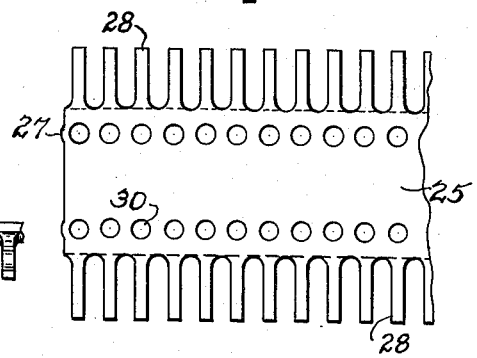
FIGS. 6 and 7 are details showing the strip and anchoring elements prior to forming the blank into the cylinder.

Each of the commutator bars has an anchoring element integral with each end thereof, slightly narrower than the circumferential width of the commutator bar, and formed, as shown particularly in FIGS. 7 and 10, somewhat in the nature of the letter S each having a portion 10 extending longitudinally parallel with the axis beneath the flange 6 at one end and a similar portion correspondingly extending beneath and parallel with the overhanging flange 7, and each anchor element has a radially extending portion as at 12, in the finished commutator positioned to be spaced from the adjacent edge of the retaining flange 6 or 7. It is then curved abruptly and turned backwardly upon itself as at 13, remaining integrally connected with the commutator bar proper 15.

In the finished commutator, the molded insulating material M holds the commutator bars and end retaining elements and hub in the relative positions shown in FIG. 3.

It will now be noted that between the ends 10 of the anchoring elements and the cylindrical overhanging flange portions 6 and 7 of the retaining disks 3 and 4, the interposed or intervening insulating plastic material will be subjected to the centrifugal force acting upon each commutator bar, and this portion of the plastic material, subject to resulting compression, is indicated in the dotted line rectangles at M¹ and M² in FIG. 10. Likewise, these compressed portions of the insulating and supporting material are shown, particularly in the upper portion of FIG. 3.

We recognize that commutator bars have been formed of a hollow cylinder of metal having projections which may engage molded core supports. Further, it is well known to separate such a cylinder into the desired number of bar segments, each having anchoring fingers or projections, by sawing or cutting after filling the cylinder with molded supporting material. However, the commercial demands and requirements for higher speeds in proportion to given diameters render such previously used anchoring means inadequate. The molded plastic material forming the core and supporting and anchoring the commutator bars is not of itself strong enough to hold the bars when subjected to these greatly increased rotational speeds. Prior anchoring elements or fingers have been turned inwardly at an angle and embedded in the supporting material, but only a small portion of the plastic itself is effective as an anchor, and its inherent tensile strength and breaking strength is inadequate.

It becomes apparent, therefore, that utilizing suitable plastic material having at least as much strength in all plysical properties, as well as insulating characteristics as the material heretofore used, and so arranging the parts that it retains and confines a solid portion of this material between longitudinally extending overlapping and insulatingly spaced shoulders constitutes a very important improvement.

Such insulating and supporting material is substantially incompressible, and when a portion of it is so confined between spaced apart rigid metallic elements as to be subjected primarily to compression only, the resistance to centrifugal force acting upon the commutator bars is so greatly increased that much higher rotational speeds and correspondingly continued maintenance of accuracy and cylindrical uniformity of the commutator may be attained.

By the construction of the parts, as above described, we are enabled to manufacture such a commutator efficiently and economically, and with desired accuracy, by a series of steps which constitute a novel method of making such a commutator.

The blank from which the cylinder is formed is of course made of suitable electrically conductive metal, such as copper or special aluminum alloy, or other metal of sufficient rigidity and conductivity.

A strip is formed by rolling or other suitable processing to provide a mid-section 25 and laterally extending parallel wing portions of reduced thickness, corresponding to that required for the S-shaped anchoring members.

As appears in FIGS. 4 to 7, the mid-portion 25 of the strip constitutes a longitudinal band of uniform width corresponding to the desired length of the commutator bars, the thinner lateral portions 26 extending each way from the thicker band. These thinner side portions are preferably about one-half the thickness of the commutator bars later cut from the mid-portion 25.

These side wings 26 are now slotted to form spaced fingers, as shown at 28, integral with the strip 25 and of the desired width for the individual anchoring elements of the commutator bars. The strip with its laterally projecting separated integral fingers is now subjected to a forming step which turns the fingers abruptly inwardly adjacent to the body of the strip. As previously described adjacent to the body of the strip. As previously described, the anchor elements comprising the hooked portions extend first inwardly at 13 close to the strip 25, and then away from the strip and then outwardly, as shown at 10, for a short distance substantially parallel with the body of the strip. The tips of the portions 10 stand in a row substantially evenly with the width of the strip, as appears in FIG. 7, or projecting slightly beyond the width of the strip, as appears particularly in FIG. 10.

The shape and dimensional proportions of the anchoring fingers may be varied to suit the conditions desired, both in the requirements of formation, as well as in the attaining of the most effective anchorage in the finished armature.

The incidental additional anchorage, above mentioned, may be provided by forming depressions in the underside of the body of the strip. As shown, shallow round cylindrical depressions 30 are formed in alignment with opposite pairs of fingers and in what will become the underside of each commutator bar. The function of these depressions will be further described hereinafter.

Figure 8:
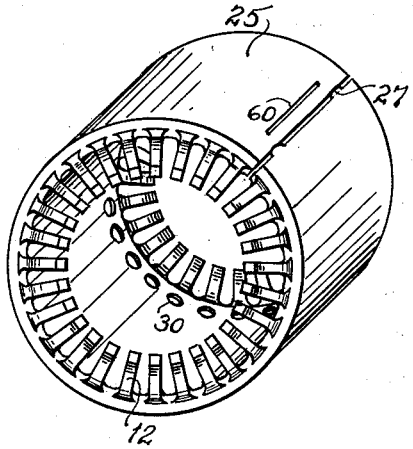
FIG. 8 is a perspective of a completed cylinder with the anchoring elements at each end.

The strip is now cut to a length equivalent to the circumference of the commutator and is formed into an accurate cylinder, as shown in FIG. 8. The cylindrical hub element 1 is then assembled, first permanently affixing one end disk 3 to the receiving shoulder, as previously described. The hub with one disk attached is then inserted into the commutator cylinder, and the end disk 4 is then applied to the hub and similarly permanently secured, as by another small end flange 5. The end disks are thus positioned with their inturned flanges surrounding the hooked ends 10 of the anchoring fingers. These parts are then positioned in a suitable die which accurately concentrically positions the components while maintaining the endwise positioning of the flanges 6 and 7, each separated from the adjacent circular row of anchoring fingers.

Referring to FIG. 12, a specially constructed die is illustrated where a central shaft or core pin 40 rises from an enlarged portion 41 forming a shoulder and a portion of the bottom wall of the die cavity in a die member 45. This die member has a bottom wall surface, as shown, and which curves upwardly slightly to an annular shoulder 46 at the lower portion of the cylindrical surface of the cavity, which is adapted to closely fit the outer surface of the armature cylinder. The shoulder 46 against which one end of the hub and one end disk may rest, is so positioned as to assure the correct spacing between the inturned flange of the end disk resting on the bottom and the adjacent row of S-shaped or hooked anchoring fingers.

The cylindrical surface of the die cavity is of a height corresponding to the width of the strip of the mid-portion 25, and it will be seen that the opposite end disk likewise has its flange properly spaced from the adjacent hooked anchoring fingers.

A closing and sprue containing die member 50 has an annular inwardly extending shoulder 51, corresponding to the shoulder 46, engaging the upper edge of the strip 25. It is provided with a curved surface 52 adapted to form or shape the anunlar shoulder at the upper end of the molded insulating material, and the cavity then tapers upwardly and inwardly to the passage for the molded material, as indicated at 54. The upper end of the core pin 40 is preferably tapered, as shown, and the surface of the flaring sprue opening is spaced to provide clearance for permitting flow of the material around the upper end disk. With the die parts firmly held in the position shown and accurately positioning the commutator components, the anchoring insulating mounting material in plastic condition is forced into and fills the cavity.

In the molding step just described, it is to be understood that the insulating material in plastic condition is forced into the cavity under very high pressure, thoroughly filling all of the confined spaces and the spaces between the anchoring fingers and end disk flanges substantially simultaneously. In practice, a very short time only is needed to sufficiently set the material to remove the molded article in its assembled form. The sprue portion of the plastic is then trimmed from the adjacent disk and hub.

The unitary commutator body is now complete except for cutting the cylindrical strip 25 into the separate commutator bars. This is accomplished by longitudinal slitting through the cylindrical portion, while properly indexing, that is, turning the precise amount after each cut according to the desired number of commutator bars, and, of course, corresponding to a number of anchoring fingers at each end of the commutator, whereby the anchoring fingers remain undisturbed and integral with their respective bars.

The position for the first slot or cut must, of course, be precisely determined, and inasmuch as the anchoring fingers may be substantially entirely enclosed and hidden by the molded insulating and mounting material, a novel means is employed for locating the first separating longitudinal cut at the beginning of the series of subsequent indexed cuts to form the commutator bars. The manner of positioning the starting cut is important for the reason that removing or even slightly defacing any part of the molded material to locate an anchoring finger would weaken or destroy the insulating effect at such a point.

A minute space between the meeting ends of the cylinder formed by the strip 25 may permit electronic detection and location for the first cut. Small projections 27 at one end of the strip 25 may be used for this purpose.

Mechanical positioning for starting indexing may be accomplished by forming an indentation in the strip 25 at a predetermined circumferential position with relation to a pair of anchoring fingers. Such an indentation may constitute a longitudinal groove or depression 60 in FIG. 8 terminating a substantial distance from each edge of the strip 25 of the cylinder. Such a longitudinal depression would need to be only one or two thousandths of an inch in depth to be engaged by a locating instrument, and preferably would be so located as to be cut away with the slit between adjacent commutator bars. The terminating of the ends of such a groove short of the sides of the cylinder is to avoid this filling with molding material during the molding operation.

A reciprocating thin circular saw may be used for slotting and indexing, and this operation may be automatic and very rapid in forming the separate commutator bars.

Conventional receiving slots, not shown, for connecting the terminals of the wires of the armature coils to the commutator bars are preferably cut later in the otherwise finished commutators.

When commutator bars are subjected to the relatively high centrifugal force, there occurs a tendency to yield or spring a minute amount which may permit minute vibration, resulting in loosening them. Relative differential of thermo-expansion and contraction between the molded insulating body material and the metal is also a factor to be considered, and, accordingly, we may provide the incidental anchorage referred to in connection with the depressions 30, two of which are shown as formed to become positioned on the underside of each commutator bar.

When the depressions 30 are formed, the shallow sides are cylindrical. When the flat bar portion 25, however, is convoluted to form the cylinder, as described, a minute dovetail effect results from the curving of the mid-strip 25, as indicated diagrammatically by the lines $30a$ in FIG. 11 where the opposite sides of these depressions become minutely convergent as are shown by these approximately radial lines $30a$. These depressions receiving the molded material afford an additional anchorage against longitudinal loosening of the bars and are helpful in avoiding the loosening resulting from the relative differential of thermo-expansion and contraction between the molded body material and the metal.

From the foregoing description it will be seen that we have provided a commutator construction in which molded insulating material is confined and encased, and that the components form, in effect, an annular spool-like container for the core of molded compound. This molded compound may be of thermo-setting or thermo-plastic material of substantial density and rigidity and preferably of low coefficient of expansion for material of this character. It should have high compressive (nonyielding) strength when set, and be resistant to cold flow. Thus, when encased and confined against flow, the molded insulating material may most effectively retain the interposed portions at $M^1$ and $M^2$ between the anchoring fingers 10 and the flanges 6 and 7, so that these interposed portions may most effectively resist the compressive action of the tendency of centrifugal force to move the commutators radially outwardly.

As indicated, the finished commutator thus comprises essentially a short cylinder of the usual shape having great rigidity and durability, and, as indicated, capable of withstanding the temperature, to which it may be subjected in use, of as high as 400° F. The insulating characteristic of the material being high, the spacing of the commutators may be determined according to standard practice, while meeting a bar to bar test for effective insulation against 225 volts D.C., for example.

Illustrative sizes of commutator, according to the present invention, may be one and a quarter inches in diameter or less; the commutator bars may be substantially eighty-thousandths of an inch in radial thickness, while the anchor portions are substantially one-half that thickness. There may be, for example, from fourteen to thirty-two commutator bars, which by our construction will maintain their longitudinal parallel and individually straight conditions and will not become loose nor likely to rattle even when subjected to most severe operating conditions.

In the slitting or cutting of the commutator bars from the mid-strip of the cylinder, the saw cuts inwardly beyond the thickness of the bars slightly, but insufficiently to weaken the solid body of the molded insulating material. The approximate proportion of the slots between the commutator bars is indicated in FIG. 11, and the cut into the material is there indicated in broken lines at $S^1$.

The method described is capable of being performed with great rapidity and economy. The formation of the bar of FIG. 4 and the fingers of FIGS. 5, 6, and 7 lending themselves to treatment by rolling and die-cutting with great rapidity; formation of the cylinder of FIG. 8 with accuracy; the positioning of the parts in the die constructed according to FIG. 12, according to the description pertaining thereto, are all steps which may be practiced with uniformity and efficiency.

The assembly of the parts prior to inserting them in the die which positions them during molding is obviously simplified over that required for previous constructions. The slotting of the cylindrical band to form the individual commutator bars 15, each with its anchoring fingers after the molding, requires only that the first slot be accurately located for subsequent indexing according to the required number of commutator bars. In practice, the indexing and reciprocation of the cutter during this slotting action may be accomplished for a complete commutator in a matter of seconds.

It is desirable to avoid, where practical, increasing the overall length of the unitary commutator. In this connection it will be noted that turning the anchoring fingers abruptly in a sharp bend, as apparent at 13 in FIG. 10, beneath the ends of the commutator bars, brings the inwardly extending portions well inside of the length of the bars resulting in shortening the commutator unit.

The solidarity, rigidity and simplicity of the components of the assembled commutator, all contribute to assurance of maintaining the relationship of the parts during such operations and subsequent handling, as well as later in use.

Obviously, any oxidation on the outer surfaces of the commutator bars may be readily removed without destroying the cylindrical accuracy of the finished commutator, and the usual receiving slots for the armature wire terminals, as stated, are preferably cut or formed shortly before attaching the terminals on the finished armature, thus avoiding intermediate oxidation within the receiving slots.

Various modifications in size and proportion and changes in the mechanical details may be made without departing from the spirit of the present invention as defined in the appended claims.

Having thus described our invention, what we claim is:

1. A method of making commutators which comprises forming an elongated metal strip having a thickened mid-portion with parallel marginal shoulders and integral side wing portions, the mid-portion being of a thickness corresponding to that of commutator bars and the wing portions being of substantially less thickness, slitting the side portions to form separated transversely aligned projections, and then bending said projections inwardly at each side of the mid-portion, shaping said projections to form anchoring fingers to project at right angles from the mid-portion and then laterally to provide anchoring ends on said fingers, providing a rigid hub portion, affixing a radial disk to one end thereof having a short cylindrical flange turned toward the hub, convoluting said mid-portion into a cylinder with meeting ends, and placing the hub portion within the cylinder and fingers, affixing a corresponding disk with a cylindrical flange turned toward the hub, placing the assembled hub with its disks and the cylinder with its fingers in a die while holding the flanges and hub concentrically and spaced from the anchoring fingers, filling the cylinder and space between the flanges with molded insulating material, removing the unitary structure thus formed, locating a saw cut position between aligned anchoring fingers and indexing and cutting the cylindrical portion to form the predetermined number of spaced commutator bars, each having its anchoring fingers with projecting ends spaced from and engaging insulating material within the flanges.

2. The method defined in claim 1 in which depressions are formed in the mid-strip in alignment with the anchoring fingers and on the side to become the inner side of each commutator bar.

References Cited in the file of this patent

UNITED STATES PATENTS

| 1,362,663 | Zimmerman | Dec. 21, 1920 |
| 2,846,602 | Collins | Aug. 5, 1958 |

FOREIGN PATENTS

| 558,360 | Italy | Aug. 22, 1956 |
| 874,619 | Germany | Apr. 27, 1953 |